United States Patent
Kim (10) Patent No.: US 9,991,764 B2
(45) Date of Patent: Jun. 5, 2018

(54) COOLING STRUCTURE OF OIL COOLING MOTOR

(71) Applicant: HYUNDAI MOBIS CO., LTD., Seoul (KR)

(72) Inventor: Sung-Chul Kim, Yongin-si (KR)

(73) Assignee: HYUNDAI MOTOR CO., LTD., Seoul (KR)

(*) Notice: Subject to any disclaimer, the term of this patent is extended or adjusted under 35 U.S.C. 154(b) by 753 days.

(21) Appl. No.: 14/498,968

(22) Filed: Sep. 26, 2014

(65) Prior Publication Data

US 2015/0123502 A1 May 7, 2015

(30) Foreign Application Priority Data

Nov. 5, 2013 (KR) .................. 10-2013-0133481

(51) Int. Cl.
| | |
|---|---|
| *H02K 5/15* | (2006.01) |
| *F16N 31/02* | (2006.01) |
| *F16C 33/66* | (2006.01) |
| *H02K 9/19* | (2006.01) |
| *H02K 5/20* | (2006.01) |
| *H02K 5/173* | (2006.01) |

(52) U.S. Cl.
CPC ............ *H02K 9/19* (2013.01); *F16C 33/664* (2013.01); *F16N 31/02* (2013.01); *H02K 5/1732* (2013.01); *H02K 5/20* (2013.01); *F16C 33/6659* (2013.01); *H02K 5/15* (2013.01)

(58) Field of Classification Search
CPC ............ H02K 5/15; H02K 5/173; H02K 5/20; H02K 9/19; F16N 31/02

USPC .................. 310/54, 58–59, 90; 384/400, 403
See application file for complete search history.

(56) References Cited

U.S. PATENT DOCUMENTS

| | | | | |
|---|---|---|---|---|
| 1,967,705 A | * | 7/1934 | Bullmer | F16N 31/02 384/403 |
| 2,819,415 A | * | 1/1958 | Waterman | H02K 9/14 310/57 |
| 3,107,956 A | * | 10/1963 | Bradley | F16C 33/6607 384/466 |

(Continued)

FOREIGN PATENT DOCUMENTS

| | | | | |
|---|---|---|---|---|
| CN | 103038983 A | | 4/2013 | |
| EP | 2924851 | * | 9/2015 | ............... H02K 5/20 |

(Continued)

*Primary Examiner* — Burton Mullins
(74) *Attorney, Agent, or Firm* — Knobbe Martens Olson & Bear LLP (57) ABSTRACT

A cooling structure of an oil cooling motor may include a housing, a front cover and a rear cover each mounted at both sides of a housing along a length direction of the housing, a rotor shaft extending through the housing and have both ends rotatably supported by bearings of the front cover and the rear cover, a rotor disposed in the housing and rotatably supported by the rotor shaft, a front oil supply groove and a rear oil supply groove formed on opposing inner sides of the front cover and the rear cover and configured to temporarily store oil stored in a bottom of the housing and scattered by churning of the rotor, and a front cover passage and a rear cover passage configured to communicate with the front oil supply groove and the rear oil supply groove, respectively.

3 Claims, 14 Drawing Sheets

(56) References Cited

U.S. PATENT DOCUMENTS

| | | | | |
|---|---|---|---|---|
| 3,833,276 | A | * 9/1974 | Baumann | H02K 5/15 |
| | | | | 310/90 |
| 5,322,373 | A | * 6/1994 | Oakes | F16C 33/664 |
| | | | | 384/462 |
| 5,859,482 | A | * 1/1999 | Crowell | H02K 5/20 |
| | | | | 310/54 |
| 7,154,201 | B2 | * 12/2006 | Kuhn | H02K 5/20 |
| | | | | 310/58 |
| 8,916,997 | B2 | * 12/2014 | Kirkley, Jr. | H02K 1/32 |
| | | | | 310/54 |
| 9,018,827 | B2 | * 4/2015 | Holopainen | H02K 5/15 |
| | | | | 310/410 |

FOREIGN PATENT DOCUMENTS

| | | | | |
|---|---|---|---|---|
| FR | 894059 | * | 12/1944 | F16N 31/02 |
| GB | 808502 | * | 2/1959 | H02K 5/1732 |
| KR | 10-0969037 B1 | | 7/2010 | |
| KR | 10-2013-0027512 A | | 3/2013 | |

* cited by examiner

COOLING STRUCTURE OF OIL COOLING MOTOR

CROSS-REFERENCE(S) TO RELATED APPLICATIONS

This application claims priority to Korean Patent Application No. 10-2013-0133481, filed on Nov. 5, 2013, which is incorporated herein by reference in its entirety.

BACKGROUND

Field

The present disclosure relates to a cooling structure of an oil cooling motor, and particularly, to a cooling structure of an oil cooling motor capable of improving cooling efficiency of an oil cooling motor.

Description of Related Art

Recently, an environmental-friendly hybrid vehicle, including a motor in addition to an engine as a driving source for driving a vehicle, has excellent fuel efficiency and therefore has been released as a future vehicle.

The motor equipped in the hybrid vehicle is inevitably cooled. In the case of a general motor of 15 to 20 kW or more, the motor is insufficiently cooled by an air cooling type and therefore is cooled by a water cooling type or an oil cooling type.

In the case of the motor (15 to 20 kW or more) for the currently released hybrid vehicle, the oil cooling and the water cooling are simultaneously used to prevent a damage of a coil cover and irreversible demagnetization of a permanent magnet, thereby increasing an output area of the motor.

Therefore, in the case of the motor of 15 to 20 kW or more, the cooling method or the cooling efficiency becomes a hot issue on the design of the motor. Korean Patent No. 10-0969037 and Korean Patent Laid-Open Publication No. 10-2013-0027512 disclose the related technology.

SUMMARY

An embodiment of the present invention is directed to a cooling structure of an oil cooling motor capable of improving durability of the motor by supplying oil scattered to a wall surface to a bearing in addition to oil directly churned into the bearing, temporarily storing the supplied oil, and improving bearing performance.

Other aspects and advantages of the present invention can be understood by the following description, and become apparent with reference to the embodiments of the present invention. Also, it is obvious to those skilled in the art to which the present invention pertains that the aspects and advantages of the present invention can be realized by the means as claimed and combinations thereof.

In accordance with an embodiment of the present invention, a cooling structure of an oil cooling motor includes: a housing having an inside fixed with a stator; a front cover and a rear cover each configured to be mounted at both sides of a housing along a length direction of the housing; a rotor shaft configured to penetrate through the housing in a length direction of the housing and have both ends rotatably supported to bearings of the front cover and the rear cover; a rotor configured to be disposed in the housing and rotatably supported to the rotor shaft to rotate by a magnetic field of the stator; a front oil supply groove and a rear oil supply groove each configured to be formed opposing inner sides of the front cover and the rear cover and temporarily store oil stored in a bottom of the housing which is scattered by churning of the rotor; and a front cover passage and a rear cover passage configured to communicate with the front oil supply groove and the rear oil supply groove, respectively, and be formed downwardly therefrom.

An outer circumferential surface of the rotor shaft may be provided with a front bearing and a rear bearing, respectively, to pass oil discharged from the front cover passage and the rear cover passage therethrough.

The front cover passage may be formed to be inclined downwardly.

The rear cover passage may be formed to be erected.

An oil guide partially enclosing an outer circumferential surface of a lower portion of the front bearing is provided and an end of the oil guide is provided with a bent part vertically bent upwardly.

A bearing retainer formed to enclose the rear bearing may be provided and a portion of an upper edge of an inner circumferential surface of the bearing retainer may be provided with an upper protrusion which protrudes in a length direction.

A portion of a lower edge of the inner circumferential surface of the bearing retainer may be provided with a lower protrusion which protrudes radially inwardly.

DESCRIPTION OF SPECIFIC EMBODIMENTS

Hereinafter, example embodiments of the present invention will be described in detail with reference to the accompanying drawings.

As discussed above, in the case of the motor of 15 to 20 kW or more, the cooling method or the cooling efficiency becomes a hot issue on the design of the motor.

That is, since the motor cooling method of an example of a hybrid vehicle adopts a method of making oil flow in a top portion of the motor by pumping in the state in which half of a bottom portion of a stator within the motor is dipped in cooling oil and making the oil flow in a lower end thereof through a cooling passage disposed at the stator side by gravity, the motor cooling method may effectively cool the stator but may not effectively cool heat generation of a rotor or a permanent magnet due to an eddy current.

Further, a method of forming a passage in the rotor to inject oil in a hollow direction of a shaft and scattering the oil due to churning and centrifugal force of the rotor when the rotor rotates has been known, but the oil scattered from the rotor may cool only a stator core and may be vulnerable to cooling of a bearing side rotatably supporting a rotor shaft which is a direct heat generation source.

Figure 1:
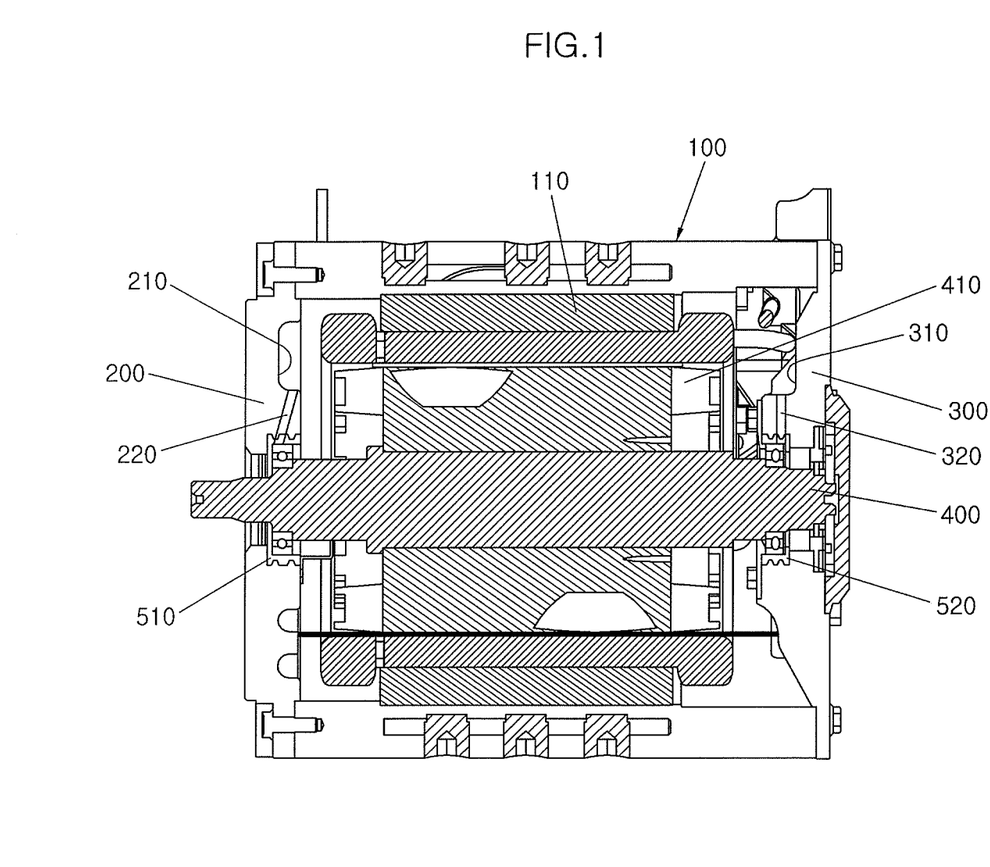
FIG. 1 is a cross-sectional view illustrating a cooling structure of an oil cooling motor in accordance with an example embodiment of the present invention.

FIG. 1 is a cross-sectional view illustrating a cooling structure of an oil cooling motor in accordance with an example embodiment of the present invention. As illustrated in FIG. 1, the cooling structure of an oil cooling motor in accordance with the example embodiment of the present invention includes a housing 100, a front cover 200, a rear cover 300, a rotor shaft 400, a rotor 410, a front oil supply groove 210, a rear oil supply groove 310, a front cover passage 220, a rear cover passage 320, a front bearing 510, and a rear bearing 520.

An inside of the housing 100 is fixed with a stator 110. Further, the rotor shaft 400 which is provided to be ratable based on a center within the housing 100 and is disposed radially inwardly of the stator 100 rotates by a magnetic field of the stator 110. In this case, the rotor 410 integrally rotating with the rotor shaft 400 rotates and is dipped in cooling oil filled in a bottom of the housing 100 each time the rotor shaft 400 rotates, and thus the cooling oil is churned.

Further, the front cover 200 and the rear cover 300 are each mounted at both ends of the housing 100 along a length direction of the housing 100. Here, the rotor shaft 400 is disposed to penetrate through a center of the front cover 200 and a center of the rear cover 300.

Opposing inner sides of the front cover 200 and the rear cover 300 are each provided with the front oil supply groove 210 and the rear oil supply groove 310. The front oil supply groove 210 and the rear oil supply groove 310 may have a depressed shape in which oil stored in the bottom of the housing 100 is scattered by the churning of the rotor 410 so as to be temporarily received.

Further, the front cover passage 220 and the rear cover passage 320 which communicate with the front oil supply groove 210 and the rear oil supply groove 310, respectively, are provided.

Figure 2A:
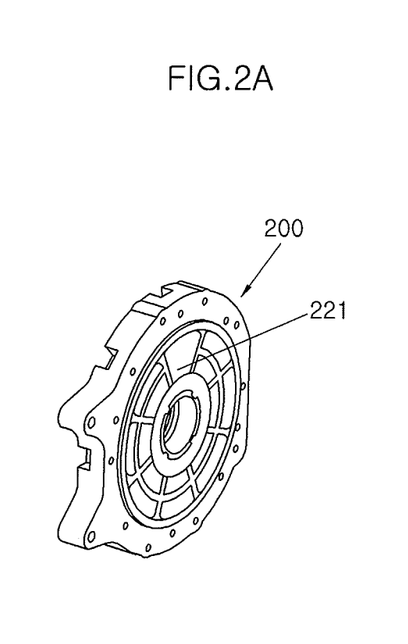
FIGS. 2A to 2C are diagrams illustrating a front cover which is applied to the cooling structure of an oil cooling motor in accordance with the example embodiment of the present invention.
Figure 2B:
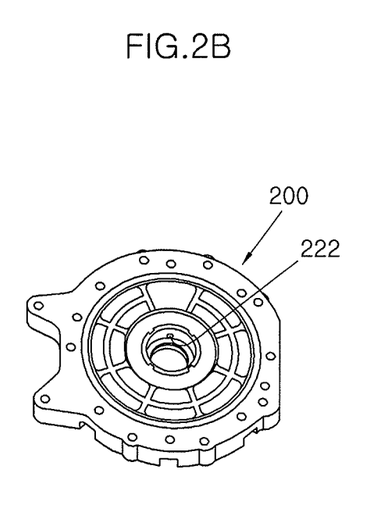
Figure 2C:
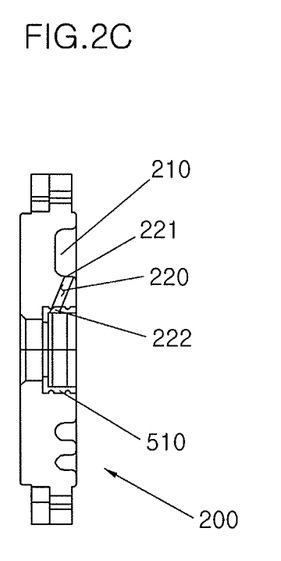

FIGS. 2A to 2C are diagrams illustrating a front cover which is applied to the cooling structure of an oil cooling motor in accordance with the example embodiment of the present invention. As illustrated in FIGS. 2A to 2C, the center of the front cover 200 applied to the cooling structure of an oil cooling motor in accordance with the example embodiment of the present invention is provided with the front bearing 510 rotatably supporting the rotor shaft 400. In this configuration, the front cover passage 220 has the front cover passage inlet 221 and the front cover passage outlet 222 formed at both ends thereof so as to communicate with the front oil supply groove 210 of the front cover 200.

Further, the front cover passage 220 may be formed to be inclined toward the front bearing 510.

Figure 3A:
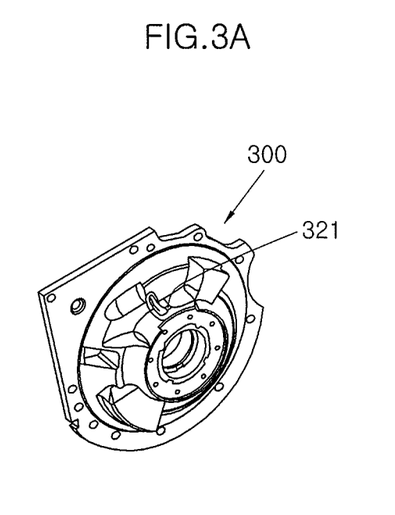
FIGS. 3A to 3C are diagrams illustrating a rear cover which is applied to the cooling structure of an oil cooling motor in accordance with the example embodiment of the present invention.
Figure 3B:
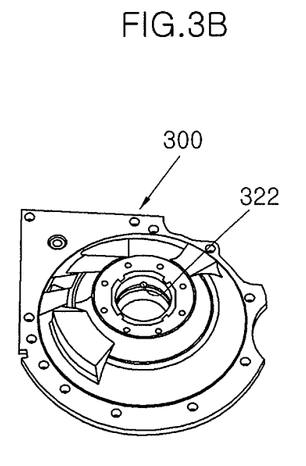
Figure 3C:
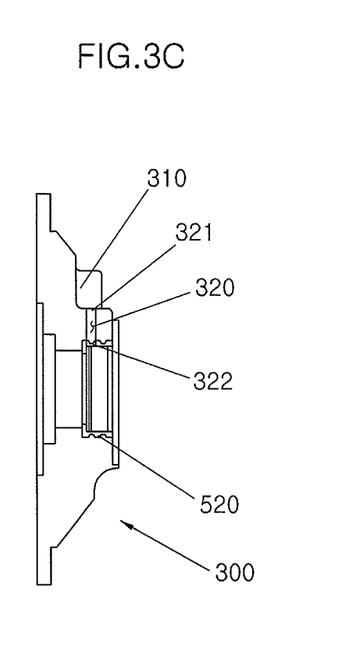

FIGS. 3A to 3C are diagrams illustrating a rear cover which is applied to the cooling structure of an oil cooling motor in accordance with the example embodiment of the present invention. As illustrated in FIGS. 3A to 3C, the center of the rear cover 300 applied to the cooling structure of an oil cooling motor in accordance with the example embodiment of the present invention is provided with the rear bearing 520 rotatably supporting the rotor shaft 400. In this configuration, the rear cover passage 320 has the rear cover passage inlet 321 and the rear cover passage outlet 322 formed at both ends thereof so as to communicate with the front oil supply groove 310 of the rear cover 300. In this configuration, the rear cover passage 320 may be formed to be erected toward the rear bearing 520.

Figure 4:
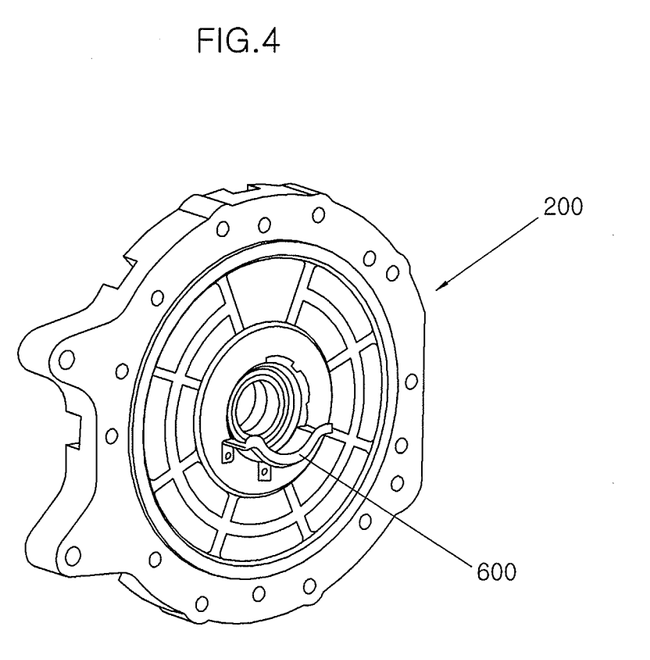
FIG. 4 is a perspective view illustrating a state in which an oil guide is applied to the front cover of the cooling structure of an oil cooling motor in accordance with the example embodiment of the present invention.
Figure 5:
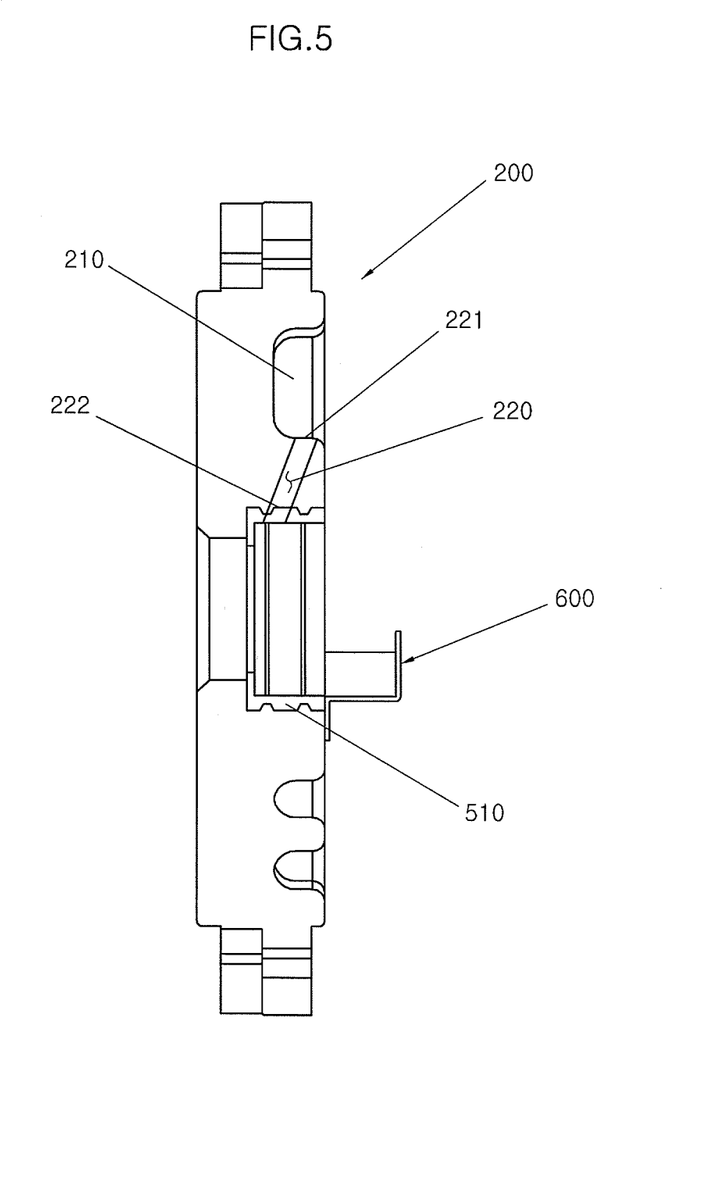
FIG. 5 is a cross-sectional view illustrating a state in which the oil guide is applied to the front cover of the cooling structure of an oil cooling motor in accordance with the example embodiment of the present invention.
Figure 6:
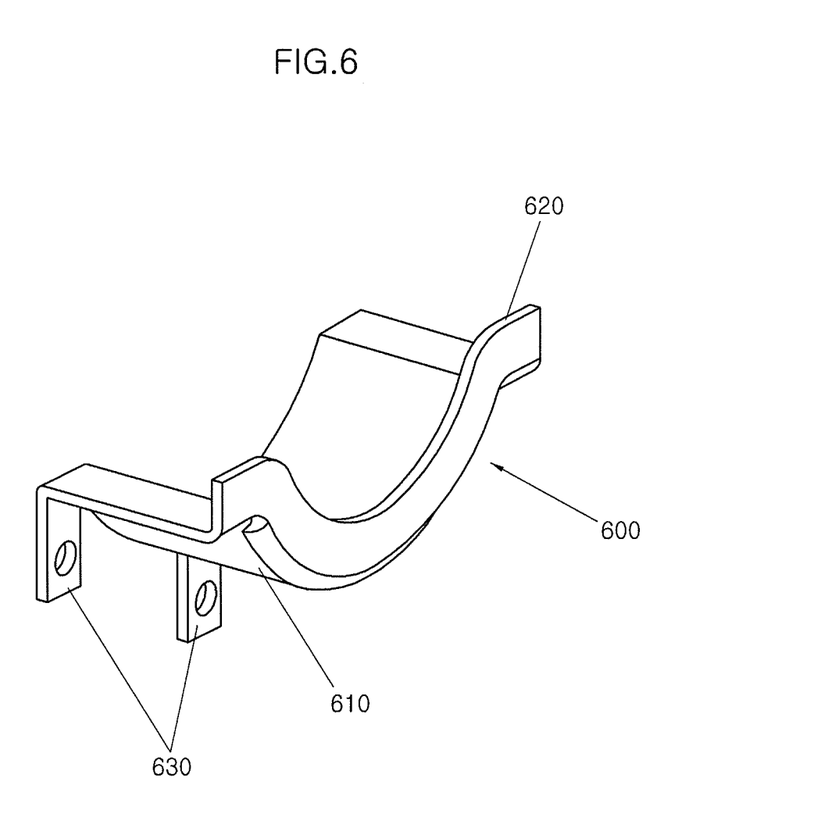
FIG. 6 is a perspective view of the oil guide which is applied to the cooling structure of an oil cooling motor in accordance with the example embodiment of the present invention.

FIG. 4 is a perspective view illustrating a state in which an oil guide is applied to the front cover of the cooling structure of an oil cooling motor in accordance with the example embodiment of the present invention, FIG. 5 is a cross-sectional view illustrating a state in which the oil guide is applied to the front cover of the cooling structure of an oil cooling motor in accordance with the example embodiment of the present invention, and FIG. 6 is a perspective view of the oil guide which is applied to the cooling structure of an oil cooling motor in accordance with the example embodiment of the present invention. As illustrated in FIGS. 4 to 6, an oil guide 600 applied to the cooling structure of an oil cooling motor in accordance with the example embodiment of the present invention may be provided with a curved portion 610 having a shape corresponding to a curved surface of the front bearing 510 to partially enclose an outer circumferential surface of a lower end of the front bearing 510 of the front cover 200. In this configuration, the cooling oil discharged through the front cover passage 220 is stored in the oil guide 600 along the outer circumferential surface of the front bearing 510. That is, the oil guide 600 extends along a shaft direction of the front bearing 510 and an end thereof is provided with a bent part 620 vertically bent, and therefore the cooling oil may be stored in a space inside the oil guide 600. The oil guide 600 may be provided with a bracket 630 to which a fastener such as a bolt may be applied so as to be mounted on the front cover 200.

Figure 7A:
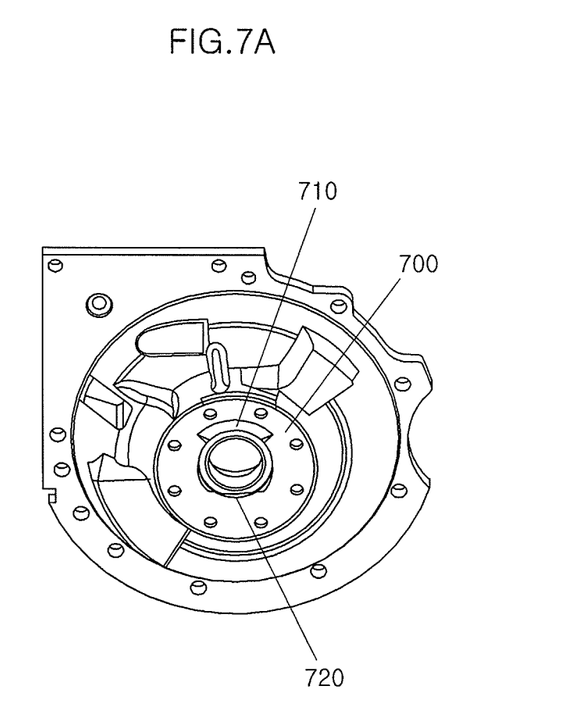
FIGS. 7A and 7B are perspective views illustrating a state in which a bearing retainer is applied to the rear cover of the cooling structure of an oil cooling motor in accordance with the example embodiment of the present invention.
Figure 7B:
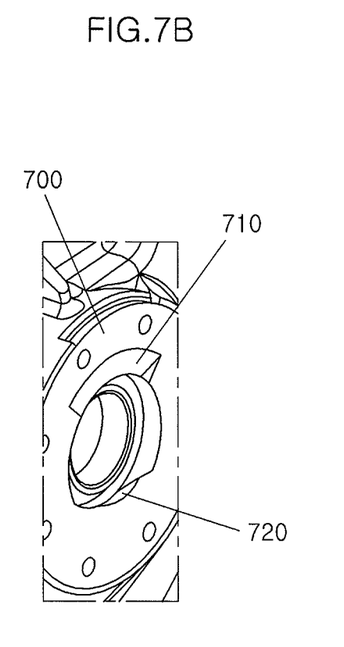
Figure 8:
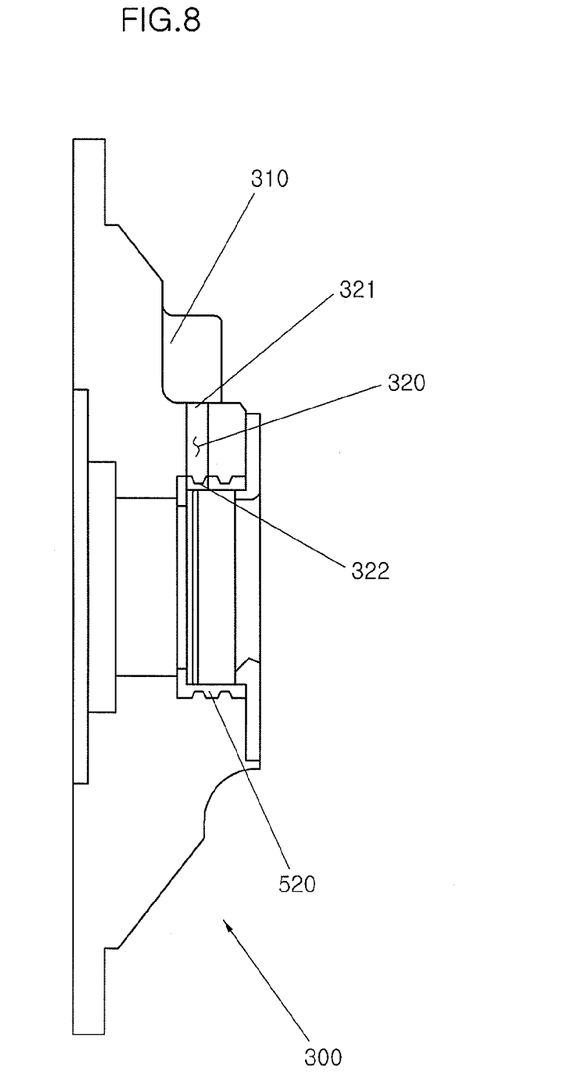
FIG. 8 is a cross-sectional view illustrating a state in which the bearing retainer is applied to the rear cover of the cooling structure of an oil cooling motor in accordance with the example embodiment of the present invention.
Figure 9:
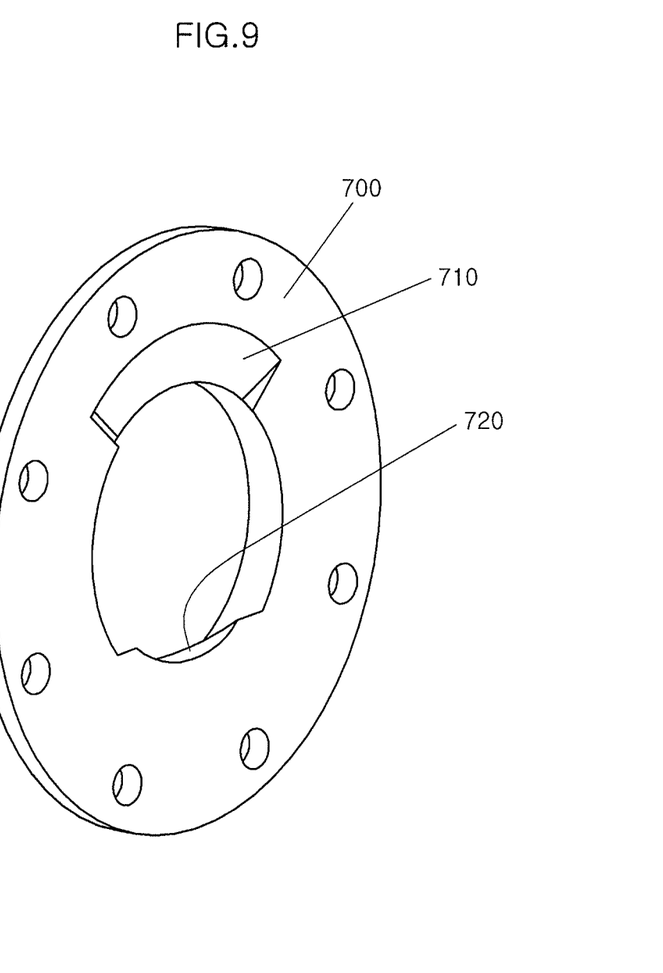
FIG. 9 is a perspective view illustrating the bearing retainer which is applied to the cooling structure of an oil cooling motor in accordance with the example embodiment of the present invention.

FIGS. 7A and 7B are perspective views illustrating a state in which a bearing retainer is applied to the rear cover of the cooling structure of an oil cooling motor in accordance with the example embodiment of the present invention, FIG. 8 is a cross-sectional view illustrating a state in which the bearing retainer is applied to the rear cover of the cooling structure of an oil cooling motor in accordance with the example embodiment of the present invention, and FIG. 9 is a perspective view illustrating the bearing retainer which is applied to the cooling structure of an oil cooling motor in accordance with the example embodiment of the present invention. As illustrated in FIGS. 7A and 7B to 9, a bearing retainer 700 mounted on the rear cover 300 to enclose and support the rear bearing 50 disposed on the same shaft as the rear cover 300 is provided. In this configuration, a portion of an upper edge of an inner circumferential surface of the bearing retainer 700 is provided with an upper protrusion 710 which protrudes in a length direction. The cooling oil temporarily collected from the rear oil supply groove 310 is more collected by the upper protrusion 710.

Further, a portion of a lower edge of the inner circumferential surface of the bearing retainer 700 is provided with a lower protrusion 720 protruding radially inwardly, and thus the cooling oil flowing downward may be additionally stored.

As described above, in accordance with the cooling structure of an oil cooling motor in accordance with the example embodiments of the present invention, it is possible to improve the durability of the motor by supplying the oil scattered to the wall surface to the bearing in addition to the oil directly churned into the bearing, storing the supplied oil, and improving the bearing performance.

The example embodiment of the present invention is described above, but the present invention is not limited to the foregoing example embodiments. Accordingly, all modifications easily changed from the example embodiments of the present invention by a person having ordinary skill in the art to which the present invention pertains are included within a scope recognized to be equivalent.

What is claimed is:

1. A motor, comprising:
   a housing comprising a first opening and a second opening opposing the first opening;
   a first cover covering the first opening and comprising a first inner surface, wherein the first inner surface comprises a first bearing recess;
   a second cover covering the second opening and comprising a second inner surface, wherein the second inner surface comprises a second bearing recess;
   a first bearing disposed in the first bearing recess;
   a second bearing disposed in the second bearing recess;
   a stator housed in the housing;
   a rotor shaft comprising a first end portion and a second end portion, wherein the first and second end portions are rotatably supported by the first and second bearings, respectively;
   a rotor disposed in the housing and rotatably supported by the rotor shaft with respect to the stator;
   a first oil supply groove formed into the first inner surface of the first cover and configured to retain oil;
   a second oil supply groove formed into the second inner surface of the second over and configured to retain oil;
   a first oil passage connecting between the first oil supply groove and the first bearing recess; and
   a second oil passage connecting between the second oil supply groove and the second bearing recess;
   an oil guide installed on the first inner surface adjacent to the first bearing recess and comprising one or more walls that define an oil retaining space for retaining oil from the first bearing recess,
   wherein the oil guide partially encloses an outer circumferential surface of a lower portion of the first bearing, wherein the one or more walls of the oil guide comprise a horizontal wall and a vertical wall vertically bent upwardly from the horizontal wall.

2. The motor of claim 1, further comprising a bearing retainer fixed to the second cover and configure to retain the second bearing inside the second bearing recess.

3. A motor, comprising:
   a housing comprising a first opening and a second opening opposing the first opening;
   a first cover covering the first opening and comprising a first inner surface, wherein the first inner surface comprises a first bearing recess;
   a second cover covering the second opening and comprising a second inner surface, wherein the second inner surface comprises a second bearing recess;
   a first bearing disposed in the first bearing recess;
   a second bearing disposed in the second bearing recess;
   a stator housed in the housing;
   a rotor shaft comprising a first end portion and a second end portion, wherein the first and second end portions are rotatably supported by the first and second bearings, respectively;
   a rotor disposed in the housing and rotatably supported by the rotor shaft with respect to the stator;
   a first oil supply groove formed into the first inner surface of the first cover and configured to retain oil; a first oil passage connecting between the first oil supply groove and the first bearing recess; and
   an oil guide installed on the first inner surface adjacent to the first bearing recess and comprising one or more walls that define an oil retaining space for retaining oil from the first bearing recess,
   wherein the oil guide partially encloses an outer circumferential surface of a lower portion of the first bearing, wherein the one or more walls of the oil guide comprise a horizontal wall and a vertical wall vertically bent upwardly from the horizontal wall.

\* \* \* \* \*